(12) United States Patent
Yagi et al.

(10) Patent No.: US 9,487,426 B2
(45) Date of Patent: Nov. 8, 2016

(54) HEAT TREATMENT METHOD OF SYNTHETIC QUARTZ GLASS

(71) Applicant: Shin-Etsu Chemical Co., Ltd., Tokyo (JP)

(72) Inventors: Hisashi Yagi, Joetsu (JP); Masaki Takeuchi, Joetsu (JP); Daijitsu Harada, Joetsu (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 14/621,732

(22) Filed: Feb. 13, 2015

(65) Prior Publication Data
US 2015/0239766 A1   Aug. 27, 2015

(30) Foreign Application Priority Data
Feb. 21, 2014   (JP) ................................. 2014-031479

(51) Int. Cl.
  C03B 25/02   (2006.01)
  C03B 19/14   (2006.01)
  C03B 32/00   (2006.01)
(52) U.S. Cl.
  CPC ........... C03B 25/02 (2013.01); C03B 19/1453 (2013.01); C03B 32/00 (2013.01); C03B 2201/23 (2013.01)
(58) Field of Classification Search
  CPC ..................................... C03B 25/02
  USPC ......................................... 65/117
  See application file for complete search history.

(56) References Cited

U.S. PATENT DOCUMENTS

| 6,732,546 | B1 | 5/2004 | Yajima et al. |
| 2003/0138587 | A1 | 7/2003 | Otsuka et al. |
| 2003/0171203 | A1 | 9/2003 | Komine et al. |
| 2005/0217318 | A1 | 10/2005 | Kuhn et al. |
| 2014/0018229 | A1 | 1/2014 | Maida et al. |

FOREIGN PATENT DOCUMENTS

| DE | 10 2010 052 685 A1 | 5/2012 |
| EP | 1 319 637 A2 | 6/2003 |
| EP | 2 684 851 A2 | 1/2014 |
| JP | 2000-154029 A | 6/2000 |
| JP | 2005-289801 A | 10/2005 |
| JP | 2010-155778 A | 7/2010 |
| JP | 2011-201771 A | 10/2011 |
| WO | 01/12566 A1 | 2/2001 |
| WO | 02/085808 A1 | 10/2002 |
| WO | 2009/106134 A1 | 9/2009 |
| WO | 2012/069382 A1 | 5/2012 |

OTHER PUBLICATIONS

Extended European Search Report dated Jul. 21, 2015, issued in corresponding application No. 15155463.1. (7 pages).
Office Action dated Aug. 23, 2016, issued in counterpart Japanese Application No. 2014-031479. (4 pages).

*Primary Examiner* — Mark Halpern
(74) *Attorney, Agent, or Firm* — Westerman, Hattori, Daniels & Adrian, LLP

(57) ABSTRACT

A method for heat treating a synthetic quartz glass having a hydroxyl concentration with a maximum/minimum difference ($\Delta OH$) of less than 350 ppm involves the steps of first heat treatment of holding at 1,150-1,060° C. for a time of 0.5-10 hours, cooling down to a second heat treatment temperature at a rate of $-7°$ C./hr to $-30°$ C./hr, second heat treatment of holding at 1,030-950° C. for a time of 5-20 hours, and annealing at a rate of $-25°$ C./hr to $-85°$ C./hr. Two stages of heat treatment ensures that the glass has a low birefringence.

10 Claims, No Drawings

HEAT TREATMENT METHOD OF SYNTHETIC QUARTZ GLASS

CROSS-REFERENCE TO RELATED APPLICATION

This non-provisional application claims priority under 35 U.S.C. §119(a) on Patent Application No. 2014-031479 filed in Japan on Feb. 21, 2014, the entire contents of which are hereby incorporated by reference.

TECHNICAL FIELD

This invention relates to the heat treatment method of synthetic quartz glass, and more particularly, to a method for heat treating a synthetic quartz glass into a low-birefringence synthetic quartz glass best suited as synthetic quartz glass substrates for photomasks in the advanced application.

BACKGROUND ART

As the exposure pattern is miniaturized to comply with the increasing integration density of VLSIs, the lithography apparatus or steppers for printing circuit patterns on semiconductor wafers use light sources of shorter wavelengths. The exposure tool light source changed from the prior art i-line (wavelength 365 nm) to KrF excimer laser (248 nm) and recently to ArF excimer laser (193 nm).

As the light source becomes of shorter wavelength, not only lenses and optical members used in the exposure tool, but also synthetic quartz glass substrates for photomasks serving as the original of IC circuit are required to be of higher precision.

Particularly in the ArF excimer laser application, the suppression and uniformity of initial absorption of laser irradiation, the presence of residual birefringence in glass substrates, and a change of birefringence during laser irradiation are of significance. The birefringence in synthetic quartz glass is attributable to the stress remaining in the material. An appropriate annealing treatment for stress removal is effective for reducing birefringence.

For example, Patent Document 1 discloses a method involving heat treating synthetic quartz glass having a hydroxyl (OH) concentration of 230 ppm at 1,100° C. for 200 hours, and annealing to 500° C. at −20° C./hr, for thereby reducing the birefringence to 10 nm/cm or less. Patent Document 2 discloses a method involving heat treating synthetic quartz glass having a hydroxyl concentration of 800 to 1,300 ppm at 1,000° C. for 10 hours, and annealing to 500° C. at −10° C./hr, for thereby reducing the birefringence to 2.0 nm/cm or less. Patent Document 3 discloses a method involving heating a synthetic quartz glass block at a first holding temperature in the range of at least 900° C., holding at the temperature for a certain time, cooling down to a temperature of 500° C. or below at a cooling rate of up to 10° C./hr, heating at a second holding temperature in the range of 500 to 1,100° C., holding at the temperature for a certain time, and cooling down to a temperature of 100° C. lower than the second holding temperature at a cooling rate of at least 50° C./hr, for thereby improving the inhomogeneity of birefringence value distribution.

The method of Patent Document 1, however, requires a heat treatment time in excess of 200 hours. A long time of annealing is undesirable from the aspects of a productivity drop and contamination with impurities from the treating environment.

In the method of Patent Document 2, the difference (ΔOH) between maximum and minimum hydroxyl concentrations is limited to 50 ppm or less. There is a problem that if ΔOH is outside the range, the birefringence becomes more than 2 nm/cm. In addition, since the step of holding at 1,000° C. for a certain time must be followed by the step of annealing to 500° C. at a rate of −10° C./hr, the overall heat treatment takes a long time.

The method of Patent Document 3 involves holding at a first holding temperature for a certain time, cooling down below a second holding temperature, and again heating at the second holding temperature. Thus a long time is also necessary for heat treatment. There is a need for a method of producing synthetic quartz glass capable of reducing birefringence through brief annealing.

CITATION LIST

Patent Document 1: JP-A 2000-154029
Patent Document 2: WO 2002/085808
Patent Document 1: JP-A 2011-201771 (WO 01/12566)

DISCLOSURE OF INVENTION

An object of the invention is to provide a method for heat treating synthetic quartz glass to produce low-birefringence synthetic quartz glass suited for reticles and photomasks subject to excimer laser irradiation, especially ArF excimer laser irradiation, and even useful in ArF immersion lithography.

The inventors have found that by subjecting synthetic quartz glass to two stages of heat treatment, and continuing the second heat treatment for a predetermined time, the birefringence of synthetic quartz glass can be reduced in a short heat treatment time.

In one aspect, the invention provides a method for heat treating a synthetic quartz glass having a hydroxyl (OH) concentration with a difference ΔOH between maximum and minimum being less than 350 ppm, comprising the steps of:
first heat treatment of holding at a temperature of 1,150 to 1,060° C. for a certain time,
cooling down to a second heat treatment temperature at a certain rate,
second heat treatment of holding at a temperature of 1,030 to 950° C. for a certain time, the time of the second heat treatment being at least 5 hours, and
annealing at a rate of −25° C./hr to −85° C./hr.
Preferably the time of the second heat treatment is 5 to 20 hours.

In another aspect, the invention provides a method for heat treating a synthetic quartz glass having a hydroxyl (OH) concentration with a difference ΔOH between maximum and minimum being at least 350 ppm, comprising the steps of:
first heat treatment of holding at a temperature of 1,150 to 1,060° C. for a certain time,
cooling down to a second heat treatment temperature at a certain rate,
second heat treatment of holding at a temperature of 1,030 to 950° C. for a certain time, the time of the second heat treatment being 10 to 15 hours, and
annealing at a rate of −25° C./hr to −85° C./hr.

In either of the embodiments, the time of the first heat treatment is preferably 0.5 to 10 hours.

In either of the embodiments, preferably the annealing step includes first annealing step from the second heat treatment temperature to 850° C. at a rate of −25° C./hr to −45° C./hr, and second annealing step from 850° C. to 500° C. at a rate of −25° C./hr to −85° C./hr.

In either of the embodiments, the step of cooling down to a second heat treatment temperature is preferably at a rate of −7° C./hr to −30° C./hr.

In either of the embodiments, the synthetic quartz glass to be treated typically has a hydroxyl concentration of 400 to 600 ppm in a central portion.

In either of the embodiments, preferably the synthetic quartz glass at the end of heat treatment has a birefringence of up to 2 nm/cm in an effective range subject to irradiation of ArF excimer laser.

Advantageous Effects of Invention

According to the invention, heat treatment method of synthetic quartz glass is divided into two stages. The second heat treatment in a temperature range which is critical to determine the birefringence of synthetic quartz glass is continued at the temperature for the specific time for thereby mitigating the temperature distribution that has been introduced in synthetic quartz glass during the cooling step after the first heat treatment. As a result, there is obtained synthetic quartz glass having a low birefringence in its effective range subject to laser irradiation on use as the optical member in ArF excimer laser process.

Controlling the time of second heat treatment makes possible heat treatment which is compliant with the difference (ΔOH) between maximum and minimum hydroxyl concentrations. Synthetic quartz glass having a lower birefringence is obtained.

When the annealing step is divided into two stages, a quartz glass block is cooled to the highly viscous state before the strain introduced in a peripheral portion by annealing migrates to a central portion. There is obtained synthetic quartz glass having a low birefringence in its effective range subject to laser irradiation on use as the optical member in ArF excimer laser process.

Since synthetic quartz glass is held at the predetermined temperature in the second heat treatment step, the rate of annealing after the second heat treatment step may be increased. Thus heat treatment is completed in a short time. The birefringence of synthetic quartz glass in an effective range subject to ArF excimer laser irradiation on use as the optical member in ArF excimer laser process can be fully reduced.

DESCRIPTION OF PREFERRED EMBODIMENTS

In general, synthetic quartz glass is manufactured by subjecting a silica-providing compound such as a silane or siloxane compound to vapor phase hydrolysis or oxidative decomposition with the aid of oxyhydrogen flame, depositing the resulting silica microparticles on a target and vitrifying the deposit. A glass ingot may be produced either by the direct process of depositing silica microparticles on a target and melt-vitrifying the deposit or the indirect process of depositing silica microparticles on a target and heat-vitrifying the deposit. In the case of the direct process, ΔOH in synthetic quartz glass and the hydroxyl concentration near the center may be adjusted by controlling the amount of the silica-providing compound, the amount of oxyhydrogen used, and burner configuration during production of synthetic quartz glass ingot. In the case of the indirect process, on the other hand, ΔOH in synthetic quartz glass and the hydroxyl concentration near the center may be adjusted by controlling the amount of the silica-providing compound, the amount of oxyhydrogen used, and burner configuration during deposition of silica microparticles and/or by heat treating in a steam atmosphere at a lower temperature than the microparticulate silica-vitrifying temperature.

The synthetic quartz glass ingot thus obtained is placed in a vacuum melting furnace where the ingot is hot worked into a synthetic quartz glass block of desired shape by using a frame of high-purity carbon, and heating at a temperature of 1,700 to 1,900° C. for 30 to 120 minutes. The hot worked synthetic quartz glass block typically has a birefringence of 15 to 35 nm/cm. Thereafter the block is heat treated in order to reduce the birefringence to 2 nm/cm or less.

At the beginning, the synthetic quartz glass block is held at a temperature of 1,150 to 1,060° C., preferably 1,120 to 1,080° C. for a certain time (first heat treatment). If the temperature of the first heat treatment is higher than 1,150° C., the block after heat treatment has a birefringence of more than 2 nm/cm and is susceptible to devitrification, deformation, and alternation of physical properties resulting from release of hydrogen and other occluded gases. If the temperature is lower than 1,060° C., the block after heat treatment has a birefringence of more than 2 nm/cm. It is preferred for productivity that the time of the first heat treatment be 0.5 to 10 hours, more preferably 2 to 8 hours.

Next, the block is cooled down to the second heat treatment temperature at a certain rate, preferably −7.5° C./hr to −30° C./hr, more preferably −10° C./hr to −25° C./hr. If the cooling rate exceeds −30° C./hr, the block after heat treatment may have a birefringence of more than 2 nm/cm and a high fictive temperature, which may cause a lowering of resistance against ArF excimer laser and a lowering of transmittance at 193 nm. If the cooling rate is less than −7.5° C./hr, the block after heat treatment may have a birefringence of more than 2 nm/cm.

Next, the synthetic quartz glass block is held at a temperature of 1,030 to 950° C., preferably 1,010 to 980° C. for a time of at least 5 hours, preferably 10 to 15 hours (second heat treatment). If the temperature of the second heat treatment is higher than 1,030° C. or lower than 950° C., no quartz glass having a birefringence of up to 2 nm/cm is obtainable.

The holding time of the second heat treatment is at least 5 hours, preferably 5 to 20 hours, more preferably 10 to 15 hours, when ΔOH is less than 350 ppm, preferably less than 250 ppm, and 10 to 15 hours, preferably 10 hours, when ΔOH is equal to or more than 350 ppm, preferably equal to or more than 400 ppm. In either case, if the time of the second heat treatment is shorter than the range, the block after heat treatment has a birefringence of more than 2 nm/cm because of the impact of thermal hysteresis upon cooling and a non-uniform temperature distribution in the block.

In the case of synthetic quartz glass having a ΔOH value of less than 350 ppm, it is undesirable from the economical standpoint to hold at the second heat treatment temperature for a long time in excess of 20 hours.

In the case of synthetic quartz glass having a ΔOH value of equal to or more than 350 ppm, if the block is held at the second heat treatment temperature for a long time in excess of 15 hours, the block after heat treatment has a birefringence of more than 2 nm/cm. Although the reason is not well understood, a proper holding time is assigned to the second heat treatment in the practice of the heat treatment method of the invention, on account of differences in the orientation of hydroxyl (OH) groups in synthetic quartz glass associated with the ΔOH value and the structural relaxation time.

The synthetic quartz glass to be heat treated should preferably have a hydroxyl concentration of 400 to 600 ppm, more preferably 450 to 550 ppm in a central portion. If the hydroxyl concentration is less than 400 ppm or more than 600 ppm, the synthetic quartz glass resulting from the heat treatment method of the invention tends to include regions having a birefringence of more than 2 nm/cm. The concentration of hydroxyl (OH) groups is determined by measuring the absorption of OH groups by infrared spectrophotometry, e.g., spectrometer SolidSpec-3700 (Shimadzu Corp.).

After the second heat treatment, the synthetic quartz glass block is annealed to 500° C. at a rate of −25° C./hr to −85° C./hr. The annealing step is preferably divided into two stages, specifically includes the first annealing step from the second heat treatment temperature to 850° C. at a rate of −25° C./hr to −45° C./hr, more preferably −30° C./hr to −40° C./hr, and the second annealing step from 850° C. to 500° C. at a rate of −25° C./hr to −85° C./hr, more preferably −35° C./hr to −75° C./hr, and even more preferably −45° C./hr to −75° C./hr.

The annealing step divided into two stages is advantageous for reducing the overall heat treatment time because a higher cooling rate than in the annealing step of the prior art heat treatment method is employable. The two-stage annealing step is also advantageous in that the birefringence of an effective range of quartz glass subject to irradiation of ArF excimer laser on use as the optical member in the ArF excimer laser process is maintained fully low.

When the quartz glass block whose internal temperature distribution has been mitigated by the second heat treatment step of holding synthetic quartz glass at a certain temperature for a certain time is cooled under the aforementioned conditions of the first annealing step, a temperature distribution develops in the quartz glass block, so that a peripheral portion assumes a relatively low temperature, and as a result, strains in the quartz glass block are concentrated in the peripheral portion. If the cooling is continued in this state at the same cooling rate as the first annealing step, the strains in the peripheral portion will advance toward the central portion of the quartz glass block. As a result, the effective range of quartz glass on use as the optical member in the ArF excimer laser process is given a higher birefringence.

In contrast, if the second annealing step is carried out at a higher cooling rate, the quartz glass block is cooled to a high viscosity state before the strains in the peripheral portion advance toward the central portion. Thus the birefringence in the effective range of quartz glass is maintained unchanged and low.

After the end of heat treatment temperature of the annealing step is reached, the glass block is typically allowed to cool down to room temperature although such post-treatment is not particularly limited. The atmosphere used in the practice of the invention is not particularly limited, and the heat treatment method may be performed in air. Also the pressure is not particularly limited, and the heat treatment method may be performed under atmospheric pressure.

The synthetic quartz glass block as heat treated is then subjected to conventional machining steps including slicing, lapping, and polishing steps. In this way, there may be manufactured synthetic quartz glass substrates of 6 inch squares and 6.35 mm thick suited for use in the ArF excimer laser process, for example.

As used herein, the term "effective range" of synthetic quartz glass on use as an optical member in the ArF excimer laser process refers to a region of synthetic quartz glass to which ArF excimer laser is irradiated. In the case of a photomask-forming optical member in the ArF excimer laser process, for example, the "effective range" corresponds to a central region of 132×132 mm squares in a substrate of 152×152 mm squares.

According to the invention, there is obtained a synthetic quartz glass having a birefringence of up to 2 nm/cm, preferably up to 1.5 nm/cm, and more preferably up to 1.0 nm/cm in the effective range, which is useful in the ArF excimer laser process.

It is noted that birefringence is measured at room temperature (25° C.) by a birefringence meter model ABR-10A by Uniopt Co., Ltd. Measurement is made in synthetic quartz glass at intervals of 10 mm, and the maximum thereof is reported as the measured value. The light source used for measurement is a He—Ne laser. A birefringence value at wavelength 193 nm is computed by multiplying the measured value by 1.5.

EXAMPLE

Examples and Comparative Examples are given below for illustrating the invention although the invention is not limited thereto. The measurements of hydroxyl concentration and birefringence are as described above.

Example 1

In an electric furnace in air and atmospheric pressure, a synthetic quartz glass block of 187 mm×187 mm×50 mm having ΔOH and central OH concentration shown in Table 1 was heated up to 1,100° C. over 5 hours and held at the temperature for 4 hours. The block was cooled down to 980° C. at a rate of −15° C./hr and held at 980° C. for 10 hours. The block was annealed to 850° C. at a rate of −30° C./hr and further to 500° C. at a rate of −50° C./hr. At this point, the power supply to the furnace was turned off, allowing the block to cool down to room temperature. A slice was cut out of a central portion of the block, lapped and polished, yielding a polished synthetic quartz glass substrate of 6 inch squares and 6.35 mm thick.

The polished substrate was measured for birefringence at 193 nm by the birefringence meter, with the result shown in Table 1.

Example 2

In an electric furnace in air and atmospheric pressure, a synthetic quartz glass block of 187 mm×187 mm×50 mm having ΔOH and central OH concentration shown in Table 1 was heated up to 1,100° C. over 5 hours and held at the temperature for 4 hours. The block was cooled down to 980° C. at a rate of −15° C./hr and held at 980° C. for 5 hours. The block was annealed to 850° C. at a rate of −30° C./hr and further to 500° C. at a rate of −50° C./hr. At this point, the power supply to the furnace was turned off, allowing the block to cool down to room temperature. A slice was cut out of a central portion of the block, lapped and polished, yielding a synthetic quartz glass substrate of 6 inch squares and 6.35 mm thick.

The polished substrate was measured for birefringence at 193 nm by the birefringence meter, with the result shown in Table 1.

Example 3

In an electric furnace in air and atmospheric pressure, a synthetic quartz glass block of 187 mm×187 mm×50 mm having ΔOH and central OH concentration shown in Table 1 was heated up to 1,100° C. over 5 hours and held at the temperature for 4 hours. The block was cooled down to 980° C. at a rate of −15° C./hr and held at 980° C. for 20 hours. The block was annealed to 850° C. at a rate of −30° C./hr and further to 500° C. at a rate of −50° C./hr. At this point, the power supply to the furnace was turned off, allowing the block to cool down to room temperature. A slice was cut out of a central portion of the block, lapped and polished, yielding a synthetic quartz glass substrate of 6 inch squares and 6.35 mm thick.

The polished substrate was measured for birefringence at 193 nm by the birefringence meter, with the result shown in Table 1.

Example 4

In an electric furnace in air and atmospheric pressure, a synthetic quartz glass block of 187 mm×187 mm×50 mm having ΔOH and central OH concentration shown in Table 1 was heated up to 1,100° C. over 5 hours and held at the temperature for 4 hours. The block was cooled down to 980° C. at a rate of −15° C./hr and held at 980° C. for 10 hours. The block was annealed to 850° C. at a rate of −30° C./hr and further to 500° C. at a rate of −50° C./hr. At this point, the power supply to the furnace was turned off, allowing the block to cool down to room temperature. A slice was cut out of a central portion of the block, lapped and polished, yielding a synthetic quartz glass substrate of 6 inch squares and 6.35 mm thick.

The polished substrate was measured for birefringence at 193 nm by the birefringence meter, with the result shown in Table 1.

Example 5

In an electric furnace in air and atmospheric pressure, a synthetic quartz glass block of 187 mm×187 mm×50 mm having ΔOH and central OH concentration shown in Table 1 was heated up to 1,100° C. over 5 hours and held at the temperature for 4 hours. The block was cooled down to 980° C. at a rate of −15° C./hr and held at 980° C. for 15 hours. The block was annealed to 850° C. at a rate of −30° C./hr and further to 500° C. at a rate of −50° C./hr. At this point, the power supply to the furnace was turned off, allowing the block to cool down to room temperature. A slice was cut out of a central portion of the block, lapped and polished, yielding a synthetic quartz glass substrate of 6 inch squares and 6.35 mm thick.

The polished substrate was measured for birefringence at 193 nm by the birefringence meter, with the result shown in Table 1.

Example 6

In an electric furnace in air and atmospheric pressure, a synthetic quartz glass block of 187 mm×187 mm×50 mm having ΔOH and central OH concentration shown in Table 1 was heated up to 1,100° C. over 5 hours and held at the temperature for 4 hours. The block was cooled down to 980° C. at a rate of −15° C./hr and held at 980° C. for 15 hours. The block was annealed to 850° C. at a rate of −30° C./hr and further to 500° C. at a rate of −50° C./hr. At this point, the power supply to the furnace was turned off, allowing the block to cool down to room temperature. A slice was cut out of a central portion of the block, lapped and polished, yielding a synthetic quartz glass substrate of 6 inch squares and 6.35 mm thick.

The polished substrate was measured for birefringence at 193 nm by the birefringence meter, with the result shown in Table 1.

Example 7

In an electric furnace in air and atmospheric pressure, a synthetic quartz glass block of 187 mm×187 mm×50 mm having ΔOH and central OH concentration shown in Table 1 was heated up to 1,100° C. over 5 hours and held at the temperature for 4 hours. The block was cooled down to 980° C. at a rate of −15° C./hr and held at 980° C. for 10 hours. The block was annealed to 850° C. at a rate of −30° C./hr and further to 500° C. at a rate of −50° C./hr. At this point, the power supply to the furnace was turned off, allowing the block to cool down to room temperature. A slice was cut out of a central portion of the block, lapped and polished, yielding a synthetic quartz glass substrate of 6 inch squares and 6.35 mm thick.

The polished substrate was measured for birefringence at 193 nm by the birefringence meter, with the result shown in Table 1.

Example 8

In an electric furnace in air and atmospheric pressure, a synthetic quartz glass block of 187 mm×187 mm×50 mm having ΔOH and central OH concentration shown in Table 1 was heated up to 1,100° C. over 5 hours and held at the temperature for 4 hours. The block was cooled down to 980° C. at a rate of −15° C./hr and held at 980° C. for 10 hours. The block was annealed to 850° C. at a rate of −30° C./hr and further to 500° C. at a rate of −50° C./hr. At this point, the power supply to the furnace was turned off, allowing the block to cool down to room temperature. A slice was cut out of a central portion of the block, lapped and polished, yielding a synthetic quartz glass substrate of 6 inch squares and 6.35 mm thick.

The polished substrate was measured for birefringence at 193 nm by the birefringence meter, with the result shown in Table 1.

Comparative Example 1

In an electric furnace in air and atmospheric pressure, a synthetic quartz glass block of 187 mm×187 mm×50 mm having ΔOH and central OH concentration shown in Table 1 was heated up to 1,100° C. over 5 hours and held at the temperature for 4 hours. The block was cooled down to 980° C. at a rate of −15° C./hr and held at 980° C. for 20 hours. The block was annealed to 850° C. at a rate of −30° C./hr and further to 500° C. at a rate of −50° C./hr. At this point, the power supply to the furnace was turned off, allowing the block to cool down to room temperature. A slice was cut out of a central portion of the block, lapped and polished, yielding a synthetic quartz glass substrate of 6 inch squares and 6.35 mm thick.

The polished substrate was measured for birefringence at 193 nm by the birefringence meter, with the result shown in Table 1.

Comparative Example 2

In an electric furnace in air and atmospheric pressure, a synthetic quartz glass block of 187 mm×187 mm×50 mm having ΔOH and central OH concentration shown in Table 1 was heated up to 980° C. over 5 hours and held at the temperature for 15 hours. The block was cooled down to 850° C. at a rate of −30° C./hr and further to 500° C. at a rate of −50° C./hr. At this point, the power supply to the furnace was turned off, allowing the block to cool down to room temperature. A slice was cut out of a central portion of the block, lapped and polished, yielding a synthetic quartz glass substrate of 6 inch squares and 6.35 mm thick.

The polished substrate was measured for birefringence at 193 nm by the birefringence meter, with the result shown in Table 1.

TABLE 1

| | | OH concentration of block (ppm) | | Birefringence of block (nm/cm) | Heat treatment | | Cooling rate from 1st to 2nd heat treatment temperature (° C./hr) | Annealing rate (° C./hr) | | Birefringence of substrate (nm/cm) |
|---|---|---|---|---|---|---|---|---|---|---|
| | | | | | 1st step temperature 1100° C. | 2nd step temperature 980° C. | | | | |
| | | | | | Holding time (hr) | | | | | |
| | | ΔOH | Central | | | | | 1st step | 2nd step | |
| Example | 1 | 447 | 548 | 25 | 4 | 10 | −15 | −30 | −50 | 1.2 |
| | 2 | 72 | 548 | 15 | 4 | 5 | | | | 1.1 |
| | 3 | 236 | 548 | 24 | 4 | 20 | | | | 0.85 |
| | 4 | 465 | 495 | 28 | 4 | 10 | | | | 1.6 |
| | 5 | 465 | 495 | 29 | 4 | 15 | | | | 1.9 |
| | 6 | 185 | 495 | 21 | 4 | 15 | | | | 1.3 |
| | 7 | 222 | 467 | 15 | 4 | 10 | | | | 1.6 |
| | 8 | 117 | 467 | 16 | 4 | 10 | | | | 0.69 |
| Comparative Example | 1 | 489 | 467 | 23 | 4 | 20 | | | | 2.1 |
| | 2 | 465 | 495 | 30 | — | 15 | — | | | 2.9 |

Japanese Patent Application No. 2014-031479 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method for heat treating a synthetic quartz glass having a hydroxyl concentration with a difference (ΔOH) between maximum and minimum being less than 350 ppm and a hydroxyl concentration of 400 to 600 ppm in a central portion, comprising the steps of:
   first heat treatment of holding at a temperature of 1,150 to 1,060° C. for a certain time,
   cooling down to a second heat treatment temperature at a certain rate,
   second heat treatment of holding at a temperature of 1,030 to 950° C. for at least 5 hours, and
   annealing at a rate of −25° C./hr to −85° C./hr.

2. The method of claim 1 wherein the time of the second heat treatment is 5 to 20 hours.

3. The method of claim 1 wherein the time of the first heat treatment is 0.5 to 10 hours.

4. The method of claim 1, wherein the heat treatment is applied to the synthetic quartz glass in the form of a block which is subsequently sliced and polished to form a substrate.

5. A method for heat treating a synthetic quartz glass having a hydroxyl concentration with a difference (ΔOH) between maximum and minimum being at least 350 ppm and a hydroxyl concentration of 400 to 600 ppm in a central portion, comprising the steps of:
   first heat treatment of holding at a temperature of 1,150 to 1,060° C. for a certain time,
   cooling down to a second heat treatment temperature at a certain rate,
   second heat treatment of holding at a temperature of 1,030 to 950° C. for 10 to 15 hours, and
   annealing at a rate of −25° C./hr to −85° C./hr.

6. The method of claim 1 wherein the annealing step includes first annealing step from the second heat treatment temperature to 850° C. at a rate of −25° C./hr to −45° C./hr, and second annealing step from 850° C. to 500° C. at a rate of −25° C./hr to −85° C./hr.

7. The method of claim 1 wherein the step of cooling down to a second heat treatment temperature is at a rate of −7° C./hr to −30° C./hr.

8. The method of claim 1 wherein the synthetic quartz glass to be treated has a hydroxyl concentration of 400 to 600 ppm in a central portion.

9. The method of claim 1 wherein the synthetic quartz glass at the end of heat treatment has a birefringence of up to 2 nm/cm in an effective range subject to irradiation of ArF excimer laser.

10. A method of making a synthetic quartz glass optical member substrate, comprising
   forming a synthetic quartz glass ingot by the direct process or indirect process;
   hot working the ingot to make a synthetic quartz glass block;
   heat treating the synthetic quartz glass block in accordance with the method of claim 1;
   slicing, lapping and polishing the synthetic quartz glass block to form the substrate.

* * * * *